Patented Apr. 14, 1936

2,037,276

UNITED STATES PATENT OFFICE 2,037,276

INSECTICIDE AND PROCESS OF MAKING SAME

Carl Sgonina, Henderson, Ky.

No Drawing. Application July 7, 1933,
Serial No. 679,314

2 Claims. (Cl. 167—34)

My invention relates to a new insecticide spray made from tobacco extract in the manner hereinafter described.

Tobacco extract (comprising water and the water soluble ingredients of the dried tobacco plant) contains aromatic oils of tobacco; gums embodying glucose or albumen; nicotine tartrate and nicotine malate; and ammonium salts. While it constitutes an insect poison, it has not, as far as known to me, been used as an insecticide spray and would not be suitable as such on account of its poor spreading qualities and the volatile nature of several of its ingredients, the nicotine content being so volatile that it would be effective only as a contact poison.

It is the object of my invention to produce a spray material from tobacco extract which will not only act as a contact poison but will also have good spreading qualities and remain on the foliage a sufficient time to serve as an effective spray of the stomach poison variety, both for sucking and chewing insects. Generally speaking, I accomplish this object by converting the nicotine alkaloid content of the extract into nicotine sulphate, a much more stable compound, and by so treating the extract as to cause its albumen content to be separated or precipitated and thus made available as a spreader whereby the spray will spread over the foliage and, when dried, the albumen and gum content of the extract will form a film which will retain the poisonous ingredients on the foliage for a substantial time— at least ten to twenty days. Nicotine sulphate, which is much more stable than nicotine compounds appearing in tobacco extract, nevertheless evolves nicotine and gradually disintegrates on exposure to air. The film referred to materially retards this disintegration.

The means employed to precipitate the albumen should not affect the gummy constituents of the tobacco extract, and I have found that suitable albumen precipitating means for my purposes are the fatty acids of cocoanut oil, or of olive oil, linseed oil, lard or tallow.

An example of the process of manufacture of my new spray material is as follows:

Tobacco extract, (formed from tobacco by treatment with hot water or by other known methods and containing from 1% to 2% nicotine) is first treated with sufficient sulphuric acid to convert all or a major portion of its nicotine content into nicotine sulphate. The extract is then concentrated under vacuum to a density of 38 to 40 degrees Baumé, and to this concentrate is added fatty acids in the proportion of approximately one pound of fatty acids to six pounds of concentrated extract. When this concentrate is diluted with water, using, for example, five ounces of concentrate to six gallons of water, a spray is formed which contains about .05% of nicotine which has been found to be sufficiently effective for most spray purposes.

When the concentrate is diluted with water to form the spray, the fatty acids react with the albumen containing constituents of the extract to form a floccy albumen precipitate which imparts the necessary spreading quality to the spray.

It will be understood that other materials may be added to the spray provided they do not react with the nicotine sulphate or the gummy constituents of the tobacco extract. Such nicotine of the extract as may not be converted by the sulphuric acid treatment, will combine with a portion of the fatty acid to form nicotine soap which will contribute to the desired uniform spreading of the spray material over the foliage.

My new spray material has the advantageous characteristics that it slowly disappears and leaves no poisonous residue.

While the presence of nicotine is essential to the effectiveness of the spray for many purposes, I have found that tobacco extract, with its nicotine removed, is an insecticide suitable for some uses when treated to precipitate its albumen as above described, and my invention in its broadest aspect is not limited to a spray material embodying nicotine. Nor do I desire that the scope of my invention be restricted to the use of the particular albumen precipitating agents named.

Having fully described my invention, what I claim as new and desire to secure by Letters Patent of the United States is:

1. The process of forming a concentrated insecticide spray material which comprises treating tobacco extract with sufficient sulphuric acid to reduce its nicotine content to a nicotine sulphate, concentrating the treated extract to a density of approximately 38 degrees Baumé, and mixing a fatty acid with said concentrate in proportion of approximately one pound of acid to six pounds of concentrate.

2. An insecticide spray comprising the material resulting from mixing water, a fatty acid, and tobacco extract embodying nicotine in the form of nicotine sulphate.

CARL SGONINA.